(12) United States Patent
Idrissi

(10) Patent No.: US 6,990,349 B1
(45) Date of Patent: Jan. 24, 2006

(54) SYSTEM AND METHOD FOR RECONNECTING A MOBILE STATION TO AN EMERGENCY OPERATOR

(75) Inventor: Yahya Idrissi, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/003,485

(22) Filed: Nov. 1, 2001

Related U.S. Application Data

(63) Continuation of application No. 09/196,912, filed on Nov. 20, 1998.

(51) Int. Cl.
*H04Q 7/20* (2006.01)

(52) U.S. Cl. ............... 455/450; 455/404.1; 455/445

(58) Field of Classification Search ........... 455/404.1, 455/414.1, 423, 403, 421, 433, 450, 521, 455/458, 510, 517, 445
See application file for complete search history.

(56) References Cited

U.S. PATENT DOCUMENTS

| | | | |
|---|---|---|---|
| 4,811,380 A | | 3/1989 | Spear ..................... 455/437 |
| 5,488,640 A | | 1/1996 | Redden et al. ............. 375/357 |
| 5,544,224 A | * | 8/1996 | Jonsson et al. ............ 455/434 |
| 5,566,236 A | | 10/1996 | MeLampy et al. ...... 379/210.01 |
| 5,590,177 A | | 12/1996 | Vilmur et al. .............. 455/436 |
| 5,687,215 A | | 11/1997 | Timm et al. ................. 379/58 |
| 5,689,548 A | * | 11/1997 | Maupin et al. ............. 455/404 |
| 5,712,900 A | | 1/1998 | Maupin et al. ............. 455/433 |
| 5,752,185 A | | 5/1998 | Ahuja ....................... 455/415 |
| 5,995,830 A | * | 11/1999 | Amin et al. ............... 455/423 |
| 6,032,040 A | * | 2/2000 | Choy et al. ................ 455/414 |
| 6,038,437 A | | 3/2000 | Zicker ....................... 455/404 |
| 6,148,190 A | * | 11/2000 | Bugnon et al. ............ 455/404 |
| 6,240,284 B1 | * | 5/2001 | Bugnon et al. ............ 455/404 |
| 6,343,216 B1 | * | 1/2002 | Kim et al. ................. 455/450 |
| 6,556,816 B1 | * | 4/2003 | Gafrick et al. .............. 379/45 |
| 6,810,263 B1 | * | 10/2004 | Cheng et al. .............. 455/510 |

FOREIGN PATENT DOCUMENTS

| | | |
|---|---|---|
| EP | 0526240 | 7/1992 |
| EP | 1 124 395 A1 * | 8/2001 |

OTHER PUBLICATIONS

U.S. Appl. No. 08/874,065, filed Jun. 12, 1997, entitled Directory Service Based on Geographic Location of A Mobile Telecommunication Unit, by John Prvett Larkins and Gary Boyd Stephens.

* cited by examiner

*Primary Examiner*—Sonny Trinh
(74) *Attorney, Agent, or Firm*—Haynes and Boone, LLP

(57) ABSTRACT

A technique for automatically reconnecting a mobile unit to an emergency operator when the connection therebetween is interrupted is described. In a preferred embodiment, when such a call is dropped, a mobile switching center ("MSC") though which the call is connected detects that the call has been dropped and, after determining that the call is an emergency call, based on the number originally dialed by the mobile unit, automatically reestablishes the connection with the mobile unit, thereby reestablishing the emergency call.

7 Claims, 1 Drawing Sheet

SYSTEM AND METHOD FOR RECONNECTING A MOBILE STATION TO AN EMERGENCY OPERATOR

This application is a Continuation of U.S. Ser. No. 09/196,912, filed Nov. 20, 1998.

TECHNICAL FIELD

The invention relates generally to radio frequency ("RF") communications systems and, more particularly, to automatic reconnection of a mobile unit to an emergency operator in such a system.

BACKGROUND OF THE INVENTION

When a user contacts an emergency operator using a mobile communications device ("mobile unit") in an RF communications network, such as a cellular network, it is important to maintain that call at all costs. If for some reason the connection is interrupted, at present, the only way to reconnect the call would be for the emergency operator to dial the mobile unit using information provided by the mobile unit during the original call.

Clearly, this technique suffers certain deficiencies. For example, it is possible that in some cases, the mobile unit would not have provided a telephone number during the original call, making it impossible for the emergency operator quickly to recall the mobile unit. Moreover, even assuming the emergency operator has the necessary information, it can take upwards of one minute or longer for the emergency operator to manually redial the number and reconnect to the mobile unit. Clearly, in emergency situations, seconds count and the delay involved in recalling the mobile unit in this manner may turn out to be critical. In addition, it may take the emergency operator several seconds to even realize that the call has been disconnected and to begin to attempt to reconnect with the mobile unit.

Therefore, what is needed is a technique for automatically reconnecting a mobile unit to an emergency operator upon interruption of a call in a manner that does not require the intervention or participation of an emergency operator.

SUMMARY OF THE INVENTION

One embodiment of the invention, accordingly, is a technique for automatically reconnecting a mobile unit to an emergency operator when the connection therebetween is interrupted. In a preferred embodiment, when such a call is dropped, a mobile switching center ("MSC") though which the call is connected detects that the call has been dropped and, after determining that the call is an emergency call, based on the number originally dialed by the mobile unit, automatically reestablishes the connection with the mobile unit, thereby reestablishing the emergency call.

A technical advantage achieved with the invention is that it is much quicker than requiring the emergency operator to reconnect with the mobile unit.

Another technical advantage achieved with the invention is that reconnection can begin immediately upon disconnection, rather than when the emergency operator realizes that disconnection has occurred.

DESCRIPTION OF THE PREFERRED EMBODIMENT

Figure 1:
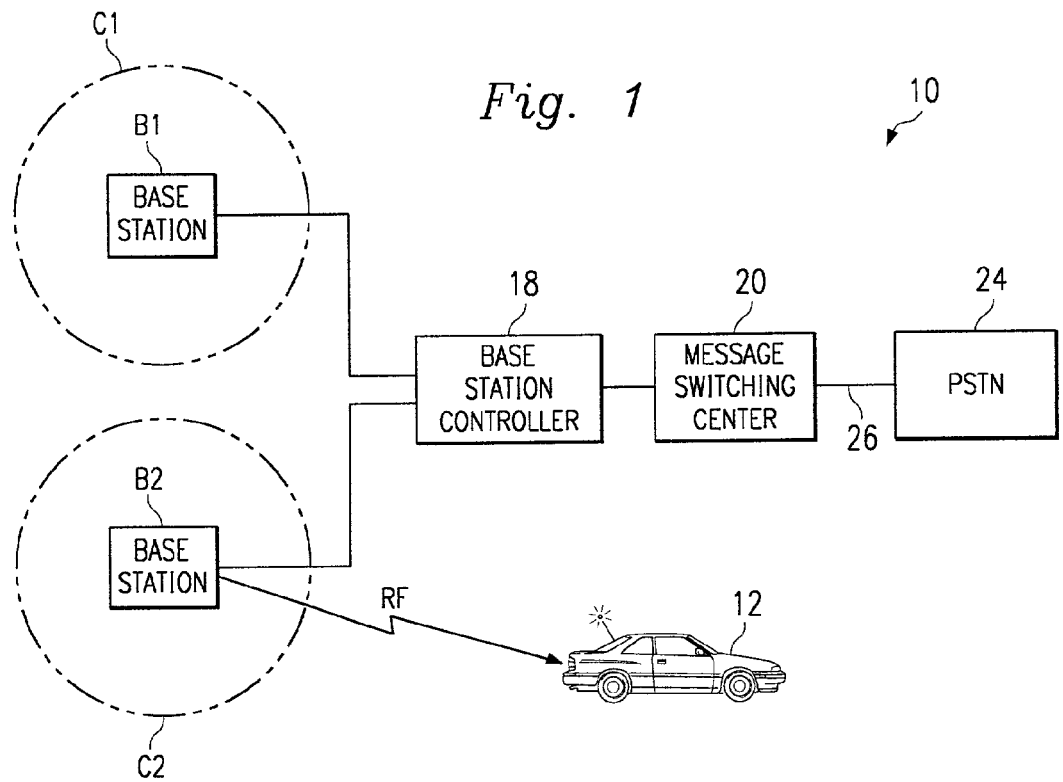
FIG. 1 is a system block diagram of a cellular communications network embodying features of the present invention.

FIG. 1 is a system block diagram of a cellular communications network 10 embodying features of the present invention. As shown in FIG. 1, the network 10 comprises a plurality of cells, represented in FIG. 1 by cells C1 and C2, each of which may be subdivided into a plurality of sectors 110 or "subcells" (not shown). Each cell C1, C2, comprises a base station B1, B2, respectively, the primary function of which is to provide over-the-air RF communication with mobile units, such as a mobile unit 12. The base stations B1, B2, are further connected via a link to a base station controller ("BSC") 18, which is in turn connected to a mobile switching center ("MSC") 20.

The MSC 20 connects the entire network 10 to a public switched telephone network ("PSTN") 24 via a land line 26. As the individual components of the network 10, as well as the PSTN 24, are well known in the art, the details thereof will not be further described, except as necessary to impart a complete understanding of the present invention.

Figure 2:
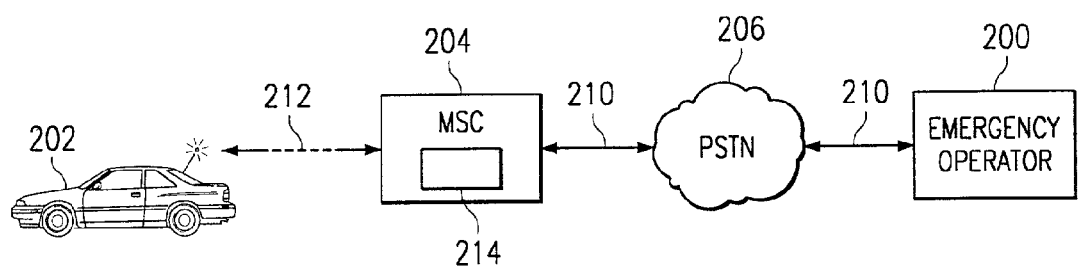
FIG. 2 illustrates the operation of the present invention.

FIG. 2 illustrates the operation of the present invention. It will be recognized that certain components of the network 10 of FIG. 1 have been omitted in FIG. 2 for the sake of clarity. Referring to FIG. 2, when a user initiates a call to an emergency operator 200 using a mobile unit 202 by dialing an emergency telephone number, e.g., "911", a connection is established between the mobile unit and the emergency operator via an MSC 204 and a PSTN 206 in a conventional fashion. It should be recognized that the mobile unit 202, MSC 204, and PSTN 206 are identical in all respects to the corresponding components illustrated in FIG. 1.

If for some reason, the call in progress is dropped, in accordance with the features of the present invention, the MSC 204, upon detecting the disconnection, will determine whether the call was placed to an emergency number and, if so, will immediately reconnect to the mobile unit 202. It will be recognized that such reconnection may be accomplished using the same mechanism as is used with call waiting technology when a user "flashes" back to reconnect to an original call that was interrupted by call waiting, for example. In most cases, the connection between the emergency operator and the MSC 204 via the PSTN 206, represented by lines 210, will remain in place while the connection between the MSC and the mobile unit 202, as represented by a line 212, is reestablished.

The detection of the call being dropped, as well as the determination of whether the call was placed to an emergency telephone number (i.e., whether the call was an emergency call) and subsequent reconnection of the dropped emergency call are accomplished using software instructions 214 stored within and executed by the MSC 204.

As previously described, the present invention enables automatic reconnection of an emergency call much more quickly than can be accomplished by manual means and therefore provides significant advantages over the prior art.

Although an illustrative embodiment of the invention has been shown and described, other modifications, changes, and substitutions are intended in the foregoing disclosure.

Accordingly, it is appropriate that the appended claims be construed broadly and in a manner consistent with the scope of the invention.

What is claimed is:

1. A method of automatically reestablishing a call placed by a mobile unit operating within a radio frequency ("RF") communications network to a called party after said call has been dropped, the method comprising:

detecting that said call has been dropped;

determining whether said call was placed to an emergency number, wherein said call is to be automatically reestablished by said RF communications network if said call was placed to an emergency number; and responsive to a determination that said call is to be automatically reestablished by said RF communications network, a mobile switching center ("MSC") of said RF communications network reestablishing said call between said mobile unit and said called party, wherein said reestablishing comprises said MSC reconnecting to said mobile unit as if the dropped call was suspended by a call waiting mechanism.

2. The method of claim 1 wherein said determining comprises determining whether said called party is an emergency operator.

3. A mobile switching center ("MSC") for automatically reestablishing a call placed by a mobile unit operating within a radio frequency ("RF") communications network to a called party connected to a public switched telephone network ("PSTN") after said call has been dropped, the MSC comprising software instructions executable by said MSC for:

detecting that said call has been dropped;

determining whether said call was placed to an emergency operator, wherein said call is to be automatically reestablished by said RF communications network if said call was placed to an emergency operator;

maintaining a connection between the emergency operator and the MSC after said call is dropped; and responsive to a determination that said call is to be automatically reestablished by said RF communications network, reestablishing a connection with said mobile unit and connecting the reestablished connection with the maintained connection between the emergency operator and the MSC, thereby to reestablish said call between said mobile unit and said emergency operator, wherein said software instructions for reestablishing comprise software instructions for causing said MSC to dial back said mobile unit using a call waiting mechanism.

4. The MSC of claim 3 wherein said software instructions for determining comprise software instructions for determining whether said call was placed to an emergency number.

5. Apparatus for automatically reestablishing a call placed by a mobile unit operating within a radio frequency ("RF") communications network to a called party after said call has been dropped, the apparatus comprising:

means for detecting that said call has been dropped;

means for determining whether said call was placed to an emergency number, wherein said call is to be automatically reestablished by said RF communications network if said call was placed to an emergency number; and means responsive to a determination that said call is to be automatically reestablished by said RF communications network for reestablishing said call between said mobile unit and said called party, wherein said means for reestablishing comprises means for reconnecting to said mobile unit using a call waiting mechanism.

6. The apparatus of claim 5 wherein said means for determining comprises means for determining whether said called party is an emergency operator.

7. The apparatus of claim 5 wherein said called party is connected to said RF communications network via a public switched telephone network ("PSTN").

* * * * *